Sept. 14, 1965  W. W. TOY  3,206,113
FLIGHT COMPUTING INSTRUMENT
Filed May 16, 1961
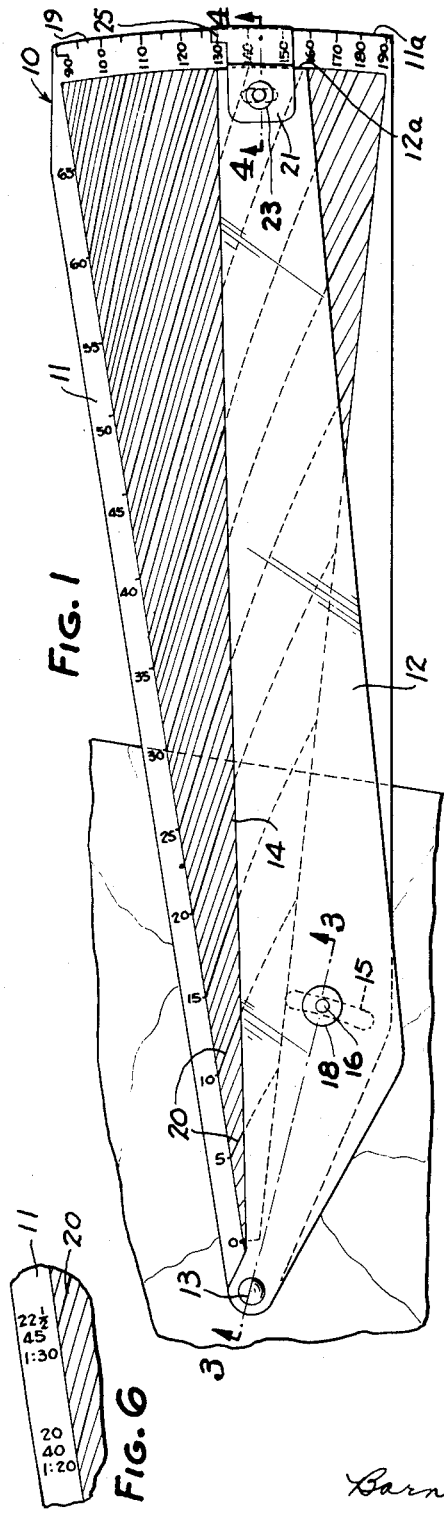
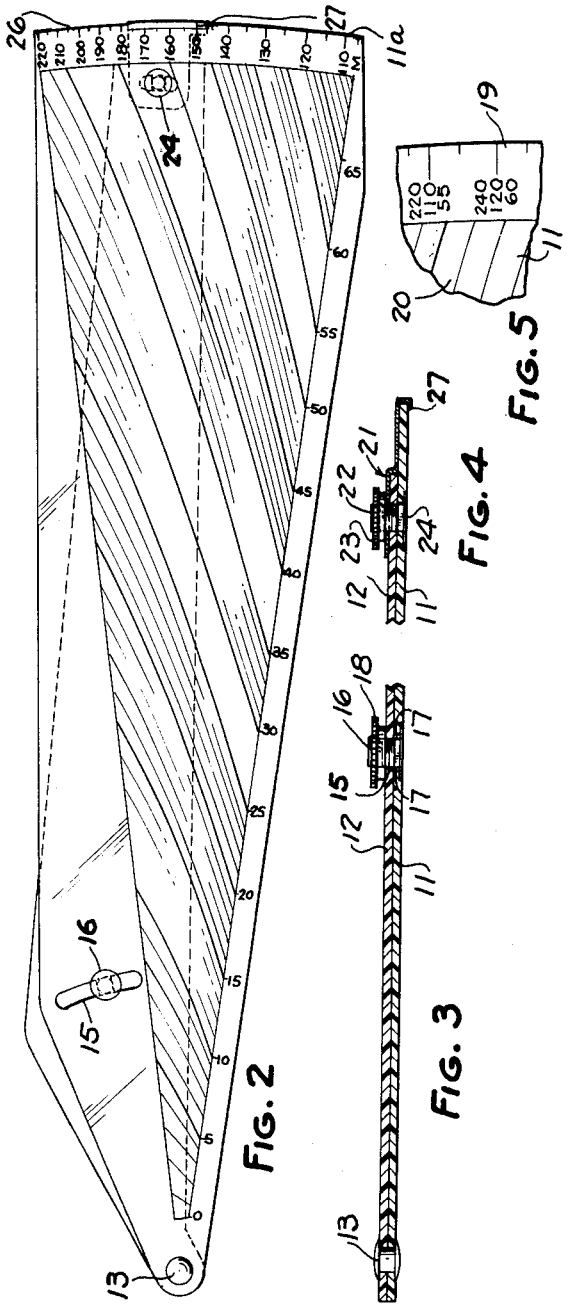
INVENTOR.
WILLIAM W. TOY
BY
Barnes, Kisselle, Raisch & Choate
ATTORNEYS United States Patent Office 3,206,113
Patented Sept. 14, 1965

3,206,113
FLIGHT COMPUTING INSTRUMENT
William W. Toy, 459 Henley Court,
Bloomfield Hills, Mich.
Filed May 16, 1961, Ser. No. 110,568
5 Claims. (Cl. 235—61)

This invention relates to flight computing instruments and particularly to an instrument of the type which is used in connection with a chart in flight to determine estimated arrival time, ground speed and approximate position.

In flying aircraft, it is necessary to make periodic checks in order to determine estimated arrival time, ground speed and approximate location. This involves a chart, scales, a computer and a plotter. In smaller aircraft where there is only a pilot, such calculations take a considerable part of the pilot's time. Obviously, during the time that these calculations are being made, the pilot cannot devote his entire energies to flying the aircraft and as a result, there is a danger of collision with other aircraft. This problem is becoming much more acute with the greater number of aircraft in the air. In addition, since the calculations involve the use of a plurality instruments the use of which involves a substantial amount of time and the aircraft has moved during that time, the result obtained by the calculation lags the current result by the time required to make the calculation.

It is an object of this invention to provide a single flight computing instrument utilized in connection with a chart for quickly and accurately determining estimated arrival time, ground speed, or approximate location.

It is a further object of the invention to provide such an instrument which is compact and can be easily stored and manipulated in the pilot's compartment without changing the basic setting thereof.

It is a further object of the invention to provide such an instrument which includes means for compensating for the errors including scale variation of Lambert conformal conic projections on the chart, scale differences caused by variations in printing register and paper size, and contraction and expansion of chart paper due to atmospheric conditions, said means being such that once an adjustment is made for a chart, it is applicable at all speeds for that chart.

Basically, the flight computing instrument comprises a transparent card and a reference member which is pivoted to the card. The transparent card includes a logarithmic ground speed scale and a plurality of radially spaced time lines such that a radial reference line on the reference member intersecting the time lines between two points is a measure of the distance between those two points. The reference member includes an adjustable index line which can be utilized to compensate the instrument for errors including scale variation of Lambert conformal conic projections on the chart, scale differences caused by variations in printing register and paper size, and contraction and expansion of chart paper due to atmospheric conditions.

In the drawings:

FIG. 1 is a top plan view of the flight computing instrument.

FIG. 2 is a bottom plan view of the instruments.

FIG. 3 is a fragmentary sectional view taken along the line 3—3 in FIG. 1.

FIG. 4 is a fragmentary sectional view taken along the line 4—4 in FIG. 1.

FIG. 5 is a fragmentary view on an enlarged scale of a portion of the device shown in FIG. 1.

FIG. 6 is a fragmentary view on an enlarged scale of another portion of the device shown in FIG. 1.

Referring to the drawings, flight computing instrument 10 comprises a transparent card 11 and a reference member 12 pivoted to the card 11 by a rivet 13. Card 11 may be made of suitable transparent plastic such as vinyl and is of generally uniform thickness throughout having the general shape of a trapezoid. Reference member 12 is preferably made of opaque plastic material and is of generally uniform thickness throughout. One edge of the reference member 12 lies along a line extending radially from the pivot 13 to form a radial reference edge 14, for purposes presently described. Transparent card 11 is formed with an arcuate slot 15 spaced radially from the pivot 13. A screw 16 extends through slots 15 and an opening in member 12. Screw 16 has flats 17 which contact the sides of the slot 15. A hand nut 18 is threaded on screw 16 to lock the reference member 12 in adjusted position relative to card 11. By loosening nut 18, the angular position of the member 12 relative to the card 11 can be adjusted.

Card 11 is provided with a logarithmic ground speed scale 19 graduated in nautical miles per hour or knots along arcuate edge 11a thereof which is radially furthermost from the pivot 13. In addition, card 11 is provided with a plurality of radially spaced time lines 20 which are so positioned that a predetermined distance on a radial reference line with respect to the pivot 13 is a measure of distance. The end 12a of reference member 12 terminates short of the edge 11a. An index member 21 is provided on the end 12a of the reference member 12 and adjacent edge 14. Index member 21 comprises a sheet metal plate which is adjustably fastened on the end of reference member 12 by a screw 22 extending through an arcuate slot 24 in the member 12. A hand nut 23 is threaded on screw 22 to lock the index member 21 in adjusted position on reference member 12. The index member 21 is provided with a flat portion which extends to the edge 11a of the card 11. An index mark 25 is provided on index member 21 adjacent the graduations of logarithmic speed scale 19. By swinging reference member 12 relative to card 11, index mark 25 can be brought into register with one of the graduations on logarithmic speed scale 19.

As shown in FIG. 2, the underside of the card 11 is provided with a second logarithmic speed scale 26 graduated in statute miles per hour.

In order to use the flight computing instrument, the instrument is first calibrated to the particular chart which is to be used by positioning the card 11 over the legend or scale of nautical miles of the chart and moving the card 11 to place the zero time line at zero and the one hour line coincident with a convenient mile mark on the legend. It may be noted that the zero time line is spaced radially from pivot 13. The reference edge 14 on the reference member 12 then is brought into alignment with the legend. At this point the index mark 25 should coincide with a graduation on scale 19 which is the same as the convenient mile mark chosen on the chart. If it does not there are errors including scale variation of Lambert conformal conic projections on the chart, scale differences caused by variations in printing register and paper size, and contraction and expansion of chart paper due to atmospheric conditions. Such errors are herein referred to for purposes of convenience as projection and chart errors. If the index mark 25 does not coincide with the proper graduation on logarithmic time scale 19, the index member 21 is then adjusted by loosening the nut 23 and lining up the index mark 25 with the speed corresponding with the convenient mile mark which has been chosen on the scale of the chart thereby compensating for the projection and chart errors. For example, if the card 11 were placed on the scale of the chart so that the one hour mark intersected 100 nautical miles, the index mark 25 should be at 100 on scale 19. If it is not, the nut 23 is loosened and the index member 21 is adjusted so that the index mark 25 coincides with 100 on the logarithmic speed scale 19. The nut 23 is then retightened and the flight computing instrument is ready for use at any time during flight with the chart to which it has been calibrated.

The flight computing instrument is then ready to be used.

In order to determine the estimated time of arrival from one place to another, the estimated aircraft ground speed is placed on the instrument 10 by loosening nut 18 and moving the reference member 12 to bring the index mark 25 adjacent the estimated ground speed on logarithmic speed scale 19. The instrument 10 is then placed upon the chart, the zero time line being placed to overlie the point of origin of the flight and the reference edge 14 is moved to intersect the destination point on the chart. The point of intersection of the reference edge 14 with a time line 20 crossing the point of destination determines the estimated lapsed time of arrival.

In order to use the flight computing instrument 10 in flight to determine the exact ground speed, the card 11 is brought into position with the zero time line 20 coinciding with a predetermined point on the chart, the instrument is then caused to be pivoted above this point until a time line 20 corresponding to the lapsed time intersects the other known point on the chart. The reference member 12 is then pivoted until the reference edge 14 intersects the two known points on the chart. The index mark 25 will then indicate the ground speed on scale 19. From this speed, estimated times of arrival may be determined between two other destinations, as described above.

The flight computing instrument 10 can also be used to determine approximate location on a chart by setting the estimated ground speed into the device, that is, by bringing the index mark 25 adjacent the estimated ground speed on logarithmic speed scale 19. By locating the zero time line 20 at the point of origin of the flight and aligning the reference edge 14 on the chart in the direction of flight, the approximate position of the aircraft can be immediately determined for any period of time by the intersection of the time lines 20 with the reference edge 14.

At any adjusted position of the flight instrument, it is possible to obtain the ground speed in statute miles per hour by merely inverting the instrument and looking at scale 26 on the back of the instrument. Index member 25 is bent over edge 11a of card 11 and includes a second index mark 27 adjacent logarithmic speed scale 26. This is of value to amateur pilots who may be more familiar with the usual layman's use of statute miles per hour instead of nautical miles per hour or knots.

In order to adapt the flight computing instrument 10 for use on various aircraft which operate at a wide diversity of speeds, the graduations on the logarithmic speed scales 19, 26 and the time lines 20 are provided in multiples as shown in FIGS. 5 and 6. As shown, for example, in FIG. 5, if the speed line of 110 is to be used then the time lines which are the larger letters in FIG. 6 are used to correspond. On the other hand, if the higher speed 220 is to be used, the time lines above the large figures in FIG. 6, namely, 22½ and 20, are used. Similarly, if the lower speed is used, 55 or 60, then the time lines below the large numerals, namely, 1:20, 1:30, are used. This expands the possible use of the instrument without requiring separate instruments for different aircraft. Additional graduations can be provided on logarithmic speed scales 19, 26 and time lines to further extend the range of the flight computing instrument.

It can thus be seen that I have provided a flight computing instrument which may be easily and quickly used to determine estimated time of arrival, ground speed and approximate location in a certain elapsed time. The single instrument takes the place of a computer and plotter which have normally been used. The instrument is compact so that it can be easily stored and used in the pilot's compartment. When not in use, it occupies a minimum of space so that it does not interfere with the flight of the aircraft. The provision of lock nuts 18 and 23 permits the flight instrument to be locked in adjusted position and again referred to without fear that the adjustment has been changed.

I have found that the use of a logarithmic speed scale on the instrument is of the utmost importance from two standpoints. First, the use of a logarithmic speed scale provides for time lines which are straighter and more nearly perpendicular to reference edge 14 resulting in a more distince point of intersection of the reference edge 14 and the time lines 20. This improves the readability and accuracy of the instrument. In addition, with a logarithmic speed scale, the adjustment of the index member 21 compensates for projection and chart errors since it adds a percentage increment of change to the setting of index marks 25, 27 which is applicable to the setting at any speed. As a result, it is only necessary to make one correction for these errors for any particular chart that is used.

I claim:

1. In a navigational computing device for use with a chart, the combination comprising a transparent card member, a reference member pivoted to said card member and providing a radial reference line, said card member having a logarithmic speed scale extending generally circumferentially thereof and a plurality of equally spaced time lines spaced radially from the pivot of the card member to the reference member thereon whereby distance along a radial line with respect to the pivot represents distance and an index member having an index mark adapted to be used in connection with said logarithmic speed scale, means for adjustably mounting said index member on the reference member with the index mark adjacent the logarithmic speed scale, and means for locking said index member in adjusted position on said reference member whereby the instrument may be adjusted for projection and chart errors and said adjustment is applicable to all speed settings.

2. The combination set forth in claim 1 wherein the zero time line is spaced from the pivot point.

3. The combination set forth in claim 1 including calibration markings on said speed scale and time lines wherein said calibrations are in multiples of one another.

4. The combination set forth in claim 1 including means for limiting the angular movement of said reference member with relation to said card member and means for locking said reference member relative to said card member in any adjusted position.

5. In a navigational computing device for use with a chart, the combination comprising a transparent card member, a reference member pivoted to said card member and providing a radial reference line, said card member having a logarithmic speed scale extending generally circumferentially thereof and a plurality of equally spaced time lines spaced radially from the pivot of the card member to the reference member thereon whereby distance along a radial line with respect to the pivot represents distance and an index member mounted on the reference member, said index member having an index mark adjacent the logarithmic speed scale, said zero time line being spaced from the pivot.

References Cited by the Examiner

UNITED STATES PATENTS

| | | | |
|---|---|---|---|
| 748,566 | 12/03 | Pierce | 235—61 |
| 1,528,944 | 3/25 | Newell. | |
| 2,247,531 | 7/41 | Thurston et al. | |
| 2,295,616 | 9/42 | Williamson. | |
| 2,416,772 | 3/47 | Reece. | |
| 2,535,374 | 12/50 | Skolnik | 235—61 |
| 2,562,224 | 7/51 | Weyrick | 33—75 |
| 2,830,760 | 4/58 | Gray | 235—61 X |
| 3,038,655 | 6/62 | Hill | 235—61 |

FOREIGN PATENTS

| | | |
|---|---|---|
| 840,947 | 5/39 | France. |
| 506,039 | 5/39 | Great Britain. |

ISAAC LISANN, *Primary Examiner*.